June 15, 1926.
W. C. HOLLAND
AUTOMOBILE PROTECTOR
Filed July 28, 1921
1,588,421
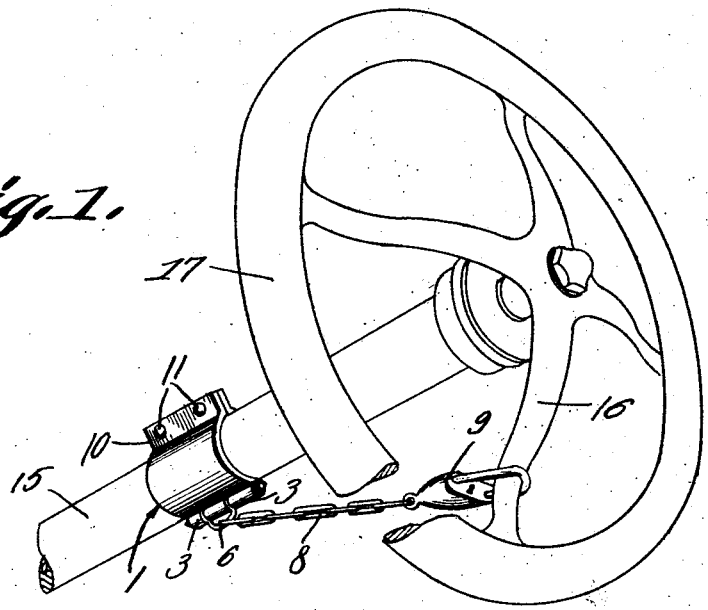
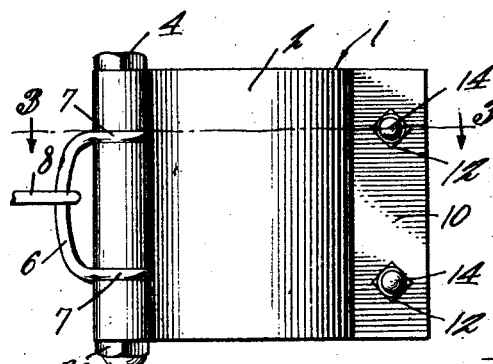
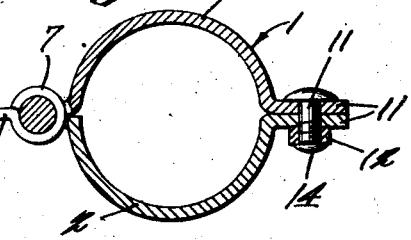
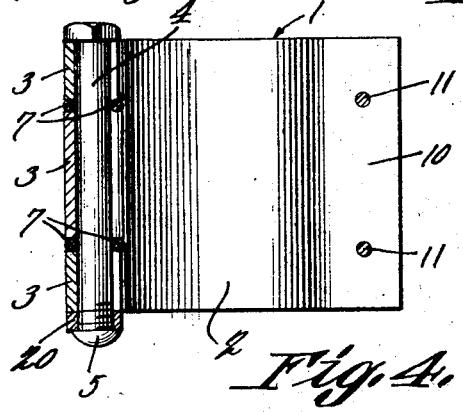
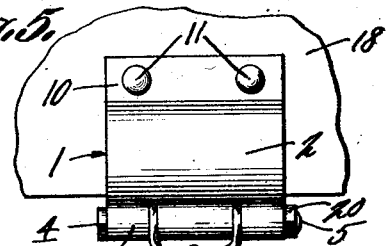
Inventor
W. C. Holland,
By C. A. Snow & Co.
Attorney Patented June 15, 1926.

1,588,421

UNITED STATES PATENT OFFICE.

WALTER C. HOLLAND, OF CLIFTON, WEST VIRGINIA.

AUTOMOBILE PROTECTOR.

Application filed July 28, 1921. Serial No. 488,092.

This invention aims to provide novel means whereby the steering wheel of an automobile, or any other like sort, may be held against movement, to the end that the automobile may not be driven away by a person having felonious intentions.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in perspective, a device of the class described applied to the steering post of an automobile; Figure 2 is a side elevation of the device per se, parts being broken away; Figure 3 is a section on the line 3—3 of Figure 2; Figure 4 is a longitudinal section; and Figure 5 is an elevation showing a modified application of the invention.

In carrying out the invention there is provided a tubular body 1 which, preferably, is made of metal, the body including two trough-shaped members 2 having alined cooperating knuckles 3, through which a pivot element 4 passes, the pivot element preferably being riveted at one end, as shown at 5, so that it cannot be removed readily. The pivot element 4 may be in the form of a bolt, carrying a nut 20, the pivot element being riveted on the nut. The numeral 6 marks a U-shaped connector having eyes 7 received between the knuckles 3, the pivot element 4 passing through the eyes 7. A fl------ ele-ment 8, such as a chain, is united with the connector 6 and carries a lock 9 of any desired construction. The trough-shaped members 2 have outstanding flanges 10 through which pass securing elements 11 such as bolts, the securing elements carrying nuts 12, the securing elements being riveted on the nuts 12 for the sake of security, as shown at 14.

The device forming the subject matter of this application may be used in various ways. Thus, if desired, the body 1 may be placed about the steering post 15 of an automobile, and the lock 9 may be engaged with one of the spokes 16 of the steering wheel 17. If desired, a depending portion 18 of the dash board of an automobile may extend between the flanges 10, as shown in Figure 5, the securing elements 11 passing through the said portion of the dash board.

What is claimed is:—

A device for anchoring an element which is subjected to strong pull, the device comprising a body made up of trough-shaped members, one of which is provided with a pair of knuckles, the other of which is provided with a single knuckle located between the pair of knuckles, the adjacent ends of the knuckles being spaced apart, a pivot element passing through the knuckles and engaging the outer ends of two of the knuckles, and a U-shaped connector of less length than the trough-shaped members, the connector being provided at its ends with eyes located in the spaces between the knuckles and embracing the pivot element and engaging the adjacent ends of the knuckles, and means for securing the trough-shaped members together, against opening movement on the pivot element.

In testimony that I claim the foregoing as my own, I have hereto affixed my signature.

WALTER C. HOLLAND.